Feb. 4, 1969 H. R. DUROSS, JR 3,425,587
ELONGATE HINGED CONTAINER AND METHOD OF FORMING SAME
Filed March 30, 1967
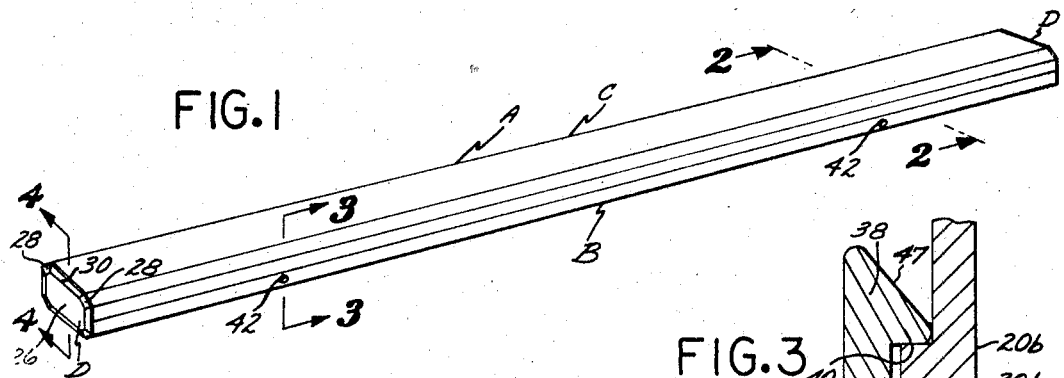
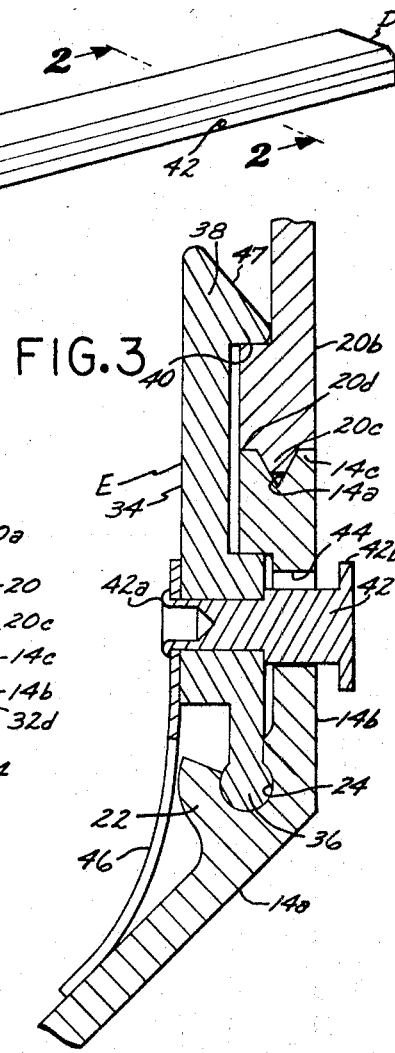
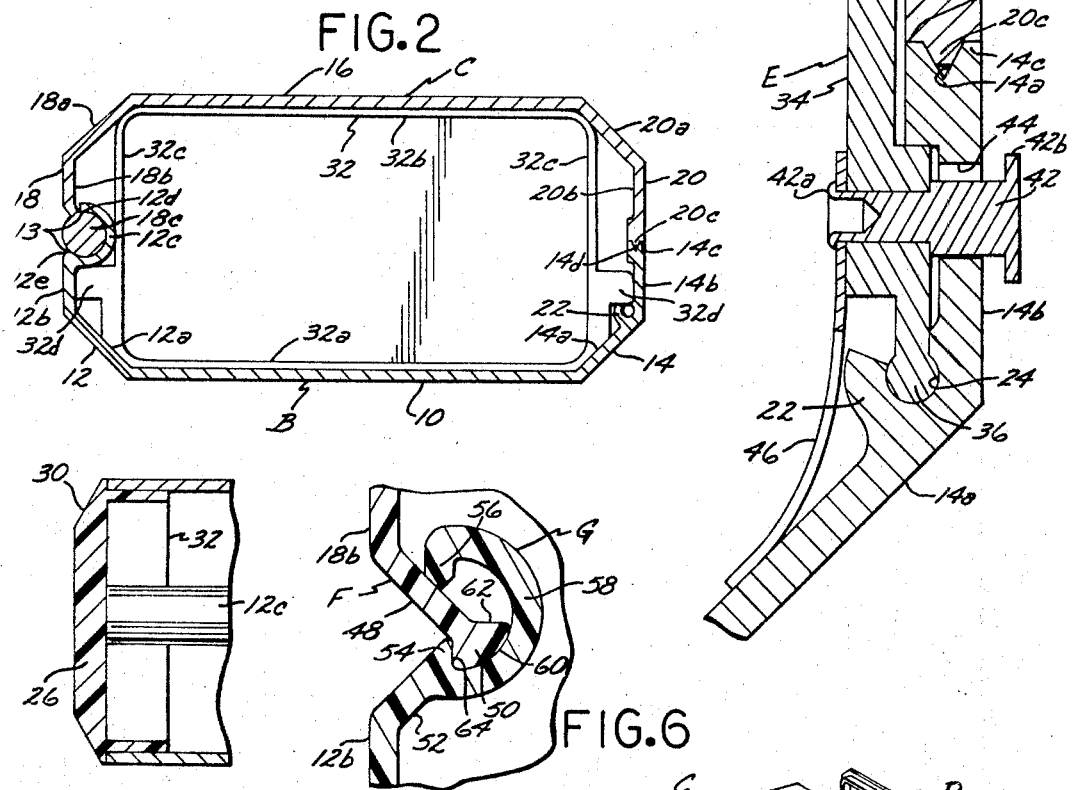
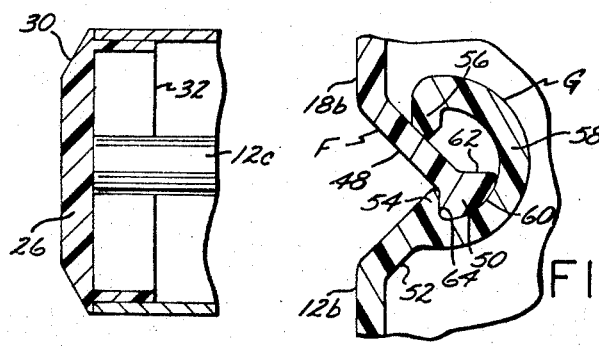
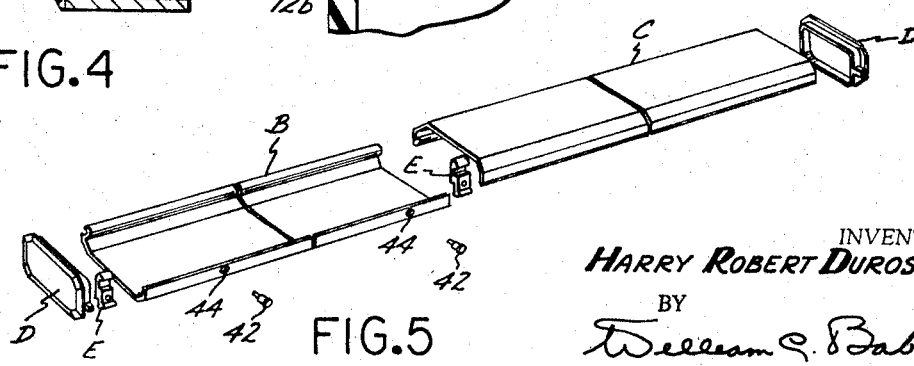
INVENTOR.
HARRY ROBERT DUROSS JR.
BY
William C. Babcock
ATTORNEY

United States Patent Office 3,425,587
Patented Feb. 4, 1969

3,425,587
ELONGATE HINGED CONTAINER AND METHOD OF FORMING SAME
Harry Robert Duross, Jr., Orange, Calif., assignor to John Moses Bishop and Emmett Francis Simon, both of Orange, Calif.
Filed Mar. 30, 1967, Ser. No. 627,013
U.S. Cl. 220—31
Int. Cl. B65d 43/16, 7/28; B21d 51/52
11 Claims

ABSTRACT OF THE DISCLOSURE

A hinged container that comprises two elongated sections with slidable and rotatably engaging portions. There are end portions attached to one of the elongated sections. And a method of forming the same.

---

The present invention relates generally to the packaging field, and more particularly to an elongate hinged container and a method of forming same.

In the merchandising field, there has for many years existed a need for an inexpensive hinged rigid container that could be formed to a desired length, and one that was particularly adapted for use in holding segments of elongate objects such as fishing rods, and the like.

A major object of the present invention is to provide a relatively inexpensive elongate hinged container of any desired length, and one that is particularly adapted for being formed from sections of an extruded rigid material.

Another object of the invention is to supply a method of sequentially forming elongate hinged containers, in which each container is identical in structure with that of the other of the containers so formed by this method.

A still further object of the invention is to supply an inexpensive elongate hinged container that requires no elaborate manufacturing facilities for its production, has a simple mechanical structure, is attractive in appearance, and one that requires little or no maintenance even when subjected to relatively hard usage such as encountered on camping trips and the like.

A further object of the invention is to furnish an elongate hinged container that is particularly susceptible to being formed from extruded sections that provide the top and bottom thereof, and preformed molded end pieces that may be fabricated from a polymerized resin, hard rubber, or the like.

These and other objects and advantages of the invention will become apparent from the following description of a preferred form thereof, and from the accompanying drawing illustrated the same, in which:

FIGURE 1 is a perspective view of on of the elongate hinged containers in a closed position;

FIGURE 2 is a transverse cross-sectional view of the device shown in FIGURE 1, and taken on the line 2—2 thereof;

FIGURE 3 is an enlarged vertical cross-sectional view of a fastener that may be used on the container, and taken on line 3—3 of FIGURE 1;

FIGURE 4 is a fragmentary vertical cross-sectional view of a portion of the container shown in FIGURE 1, taken on the line 4—4 thereof;

FIGURE 5 is an exploded perspective view of the components used in forming the hinged container shown in FIGURE 1; and FIGURE 6 is a vertical cross-sectional view of a first alternate form of hinge structure used in pivotally supporting the top of one of the containers from the bottom portion thereof.

Referring now to the drawing, it will be seen that the invention is an elongate hinged container A, as shown in FIGURE 1, that may be of any desired length. Each container A is formed from three major components. These components are first and second elongate container defining members B and C respectively, that are preferably sections cut from lengths of extruded material. The third major component is a pair of identical end pieces D. The end pieces D are preferably molded from hard rubber, a polymerized resin, or like material. It will be apparent that inasmuch as the members B and C are sections of lengths of extruded material, the container A can be formed in any desired length to accommodate a particular elongate piece or pieces of merchandise (not shown), such as sections of fishing rods. In addition to the three major components above mentioned, each container A includes fastening means E for removably maintaining the member C in a closed position on member B. One form of fastening means E is shown in detail in FIGURE 3.

The first container defining member B, which serves as the bottom portion of the container A, includes an elongate rectangular web 10 that has first and second walls 12 and 14 respectively, extending outwardly in the same direction from the longitudinal edges thereof. The first and second walls 12 and 14 include angularly disposed portions 12a and 14a and vertically extending portions 12b and 14b, as may best be seen in FIGURE 2. The wall portion 12b develops at its outer extremity into a longitudinally extending engageable portion 12c of open arcuate transverse cross section. The portion 12c encompasses in excess of 180 degrees of a circle therein.

Second container defining member C includes an elongate rectangular web 16 that has first and second side walls 18 and 20 respectively, projecting from the longitudinal edges thereof. The first and second side walls 18 and 20 include angularly disposed portions 18a and 20a that develop into straight parallel portions 18b and 20b on the outer ends thereof. The side wall portion 18b on the outer end thereof develops into a longitudinally extending engageable member 18c of circular transverse cross section that is slidably and pivotally supported within the confines of the engaging portion 12c. The longitudinally extending edge 14c of wall portion 14b has a V-shaped recess 14d formed therein that may be engaged by a tapered rib 20c that forms a part of the wall portion 20b. The engagement of rib 20c with recess 14d occurs only when the second container defining member C is in a closed position on the first container defining member B, as illustrated in FIGURE 2. The inter-engagement of rib 20c with recess 14d serves to reinforce the second wall 14 and side wall 20 against lateral deformation when a transversely directed force is exerted thereon.

Second wall 14 at the junction of portions 14a and 14b thereof is of enlarged transverse cross section, and designated by the numeral 22 in FIGURE 3. The enlarged portion 22 has a longitudinally extending groove 24 of circular transverse cross section formed in the upper portion thereof for reasons that will later be explained.

Each of the molded end pieces D, as may best be seen in FIGURES 2, 4 and 5, includes a rectangular plate 26 that has tapered corners 28. The plates 26 are of such dimensions as to completely obstruct the open ends of the container defining members B and C when disposed in the ends thereof, and the member C is in the closed position shown in FIGURE 1. For decorative purposes each plate 26 has a tapered margin 30 defined on the outer surface thereof. A hollow rectangular flange 32 projects from the side of each plate 26 opposite that on which the margin 30 is defined. Each flange 32 is of such shape and size that the sides 32a and 32b thereof are in abutting contact with the inner end surfaces of webs 10 and 16, respectively when the container A is in the closed position as shown in FIGURES 1 and 2.

The flange 32 includes two sides 32c that have lugs 32d extending outwardly therefrom in opposite directions. One of the lugs 32d engages the lowermost part of the engaging portion 12c, while the other lug is disposed directly above the enlarged portion 22 as shown in FIGURE 2. End pieces D as previously mentioned, are preferably formed from a hard non-metallic material that can be formed into the desired shape by conventional means, such as injection molding or the like. The end pieces D have the sides 32a and lower portions of the sides 32c of flanges 32 bonded to the interior end surfaces of web 10 and parts of the end interior surfaces of first and second wall portions 12a and 14a. The end pieces D in addition to closing the ends of container A, also serves the function of preventing the engageable member 18c from being inadvertently displaced from engaging members 12c.

One form of fastening means E that may be used to maintain the container A in a closed and locked position is shown in detail in FIGURE 3. Two of the fastening means E are preferably used on each container A, and longitudinally spaced from one another.

Each fastening means E includes a latch 34 that has a lower extremity 36 of circular transverse cross section that is pivotally supported in the groove 24. The groove 24 encompasses more than 180 degrees of a circle, and as a result the latches 34 will not be inadvertently displaced therefrom. The latches 34 are slidably inserted into groove 24 prior to the end pieces D being bonded to the first container defining member B. Each latch 34 has a head 38 that is of such shape as to removably engage a part of a longitudinally extending shoulder 40 defined in the lower interior part of side wall portion 20b, as shown in FIGURE 3.

An elongate button 42 projects outwardly from each latch 34, and extends through an opening 44 formed in wall portion 14b, as shown in FIGURE 3. Each button 42 has a clip spring 46 affixed to the inner end portion thereof, which spring extends downwardly and abuts against the interior surface of wall portion 14a. The spring 46 of each fastening means E tends to maintain latch 34 at all times in an outwardly pivoted position. When second container defining member C is pivoted towards a closed position, the inner edge 20d thereof engages the tapered edge 47 of latch 34, and pivots the latch in a counterclockwise direction. After the shoulder 40 on second container defining member C has moved below head 38, the spring 46 pivots the latch 34 to a locking position as shown in FIGURE 3. Latches 34 are easily disengaged from the shoulder 40 by pressing inwardly on buttons 42.

A modified form of hinged structure F for the second container defining member C is shown in FIGURE 6. In the modified form F, the lower longitudinal edge of the side wall portion 18b develops into an angularly disposed longitudinally extending rib 48 that has a wedge-shaped engaging member 50 on the outer end thereof, as can best be seen in FIGURE 6. The engaging member 50 is pivotally movable in an engageable member G. The engageable member G is supported by an angularly disposed extension 52 on the upper end of the first wall portion 12b.

The engageable member G includes two stops 54 and 56 that are connected by a substantially semi-circular arcuate segment 58, as shown in FIGURE 6. Engaging member 50 includes a longitudinally extending surface 60 that has substantially the same radius of curvature as the interior surface of the arcuate segment 58. The engaging member 50 also includes a longitudinally extending first surface 62 that is adapted to abut against the stop 56 when the second container defining member C is in an open position relative to the first container defining member B. When the second container defining member C is in the closed position, a longitudinally extending surface 64 of the engaging member 50 is in abutting contact with the stop 54, as best seen in FIGURE 6. It will be particularly noted in FIGURES 2 and 3 that the engageable portions 12c and G are of such configuration that the second container defining member C can pivot at least 90 degrees in a counterclockwise direction relative to the first container defining member B. When the second container defining member C, as shown in FIGURE 2, is pivoted counterclockwise to the open position, it is so supported by the part of second side wall portion 18b adjacent engageable member 18c abutting against the upper outer extremity of first wall portion 12b. The open longitudinally extending space 13 between the edges 12d and 12e of engageable member 12c will transversely be slightly less than 180 degrees.

When a container A embodying the hinge structure F shown in FIGURE 6, has the second container defining member C pivoted counterclockwise to the open position, the member C is so supported by the surface 62, engaging stop 56, and the outer surface of rib 48, resting on the external upper surface of first wall portion 12b.

The method of sequentially forming the containers A is extremely simple. Lengths of extruded material of the transverse cross sections of the first and second container defining members B and C, as shown in FIGURE 2, are either formed or obtained from a commercial source, with the material defining these extruded lengths preferably being of a lightweight nature, such as aluminum or one of the numerous aluminum alloys commercially available for this purpose. The extruded lengths (not shown) are cut into sections, with each section being slightly shorter than the overall length of the finished container A.

Openings 44 are now drilled or otherwise formed in the wall partions 14b, and the latches 34 pivotally mounted in the groove 24. Each spring 46 has a bore formed therein caused to engage the inner flattened end 42a of the button 42. The button preferably has a head 42b of greater transverse cross section than that of the opening 44. The lower end of each spring 46 is placed in abutting contact with the interior surface of the wall portion 14a.

The engageable member 18c is now slid longitudinally into the confines of the engaging member 12c, and the end pieces D bonded to the end portions of the first container defining member B. The inner surfaces of the plates 26 are adjustably disposed to the ends of the second container defining member C, when the member C is in a closed position, as may be seen in FIGURE 4. The sequence of steps in the method may to a degree be varied to suit the convenience of the manufacturer. The container A is now completed.

It will be particularly noted that inasmuch as the first and second container defining members B and C are formed from aluminum or an aluminum alloy, they can be anodized to any desired color. The anodizing has the distinct advantage over paint or enamel that it does not tend to chip or otherwise become disfigured, even after the container has been used for a prolonged period of time. In forming the containers A from lengths of extruded material, it is of course highly desirable from an economic standpoint to have the longitudinal dimensions of the containers A such that an even number thereof can be obtained from lengths of the extruded material (not shown) with a minimum of wastage thereof. When it is desired to use a polymerized resin to form the first and second container defining members B and C, the hinged structure F, as shown in FIGURE 6, is preferably employed, as this structure does not require the precision in extrusion as does the form of hinge structure shown in FIGURE 2.

The assembly and operation of the container A has previously been described in detail and need not be repeated.

Although the present invention is fully capable of achieving the objects and providing the advantages hereinbefore mentioned, it is to be understood that it is merely illustrative of the presently preferred embodiments thereof and I do not mean to be limited to the details of construction shown and described, other than as defined in the appended claims.

I claim:

1. A method of sequentially forming a plurality of hinged containers of identical structure that includes the steps of:
   (a) extruding at least one length of a first container defining member that is longer than a plurality of said containers when disposed end to end, said first container defining member having a flat elongate first web that has first and second walls extending outwardly from the longitudinal edges thereof, with said first wall terminating in an engageable portion;
   (b) extruding at least one length of a second container defining member that is longer than a plurality of said containers when disposed end to end, said second container defining member having a flat elongate second web that has first and second side walls extending outwardly from the longitudinal edges thereof, with said first side wall terminating in an engaging portion;
   (c) cutting said lengths into a plurality of sections of slightly less than the longitudinal dimensions it is desired to have in said containers;
   (d) hinging each of said sections of said first container defining members to one of said sections of said second container defining members by longitudinally moving said engaging member thereof into said engageable member, with said sections of said first and second container defining members then constituting the bottom and top portions respectively of one of said containers, and said first and second container defining members being of such width that said second wall and second side wall have the free longitudinal edges thereof in abutting contact when said top portion is closed on said bottom portion;
   (e) forming a plurality of end pieces from a rigid material, with said end pieces having endless flanges projecting therefrom that are of such dimensions that the external surfaces thereof are in abutting contact with the interior surfaces of said webs, when said top portions are in said closed positions; and
   (f) sequentially bonding said flanges of two of said end pieces to the interior end surfaces of each of said sections of said first container defining member after the letter has had a section of said second container defining member hingedly connected thereto.

2. A method as defined in claim 1 wherein said first wall and first side wall are of such configuration as to removably interlock with one another when the free edges thereof are in abutting contact to cooperatively reinforce said container against lateral deformation.

3. A method as defined in claim 1 wherein said engageable portion is of arcuate transverse cross section and includes in excess of 180 degrees of a circle.

4. A method as defined in claim 1 wherein said engaging portion is of transverse circular cross section and snugly and slidably engages the interior surface of said engageable portion.

5. A method as defined in claim 1, wherein said engageable portion includes two spaced stops that are connected by an arcuate segment, and said engaging portion has a generally transverse wedge shape that includes an arcuate surface that is in sliding contact with the interior surface of said arcuate portion.

6. A method as defined in claim 1 which includes the further steps of:
   (g) forming said second wall with a longitudinally extending groove and said second side wall with a longitudinally extending shoulder therein; and
   (h) pivotally supporting at least one springloaded latch from said groove that at all times tends to remain in engagement with said shoulder when said free edges of said first wall and first side wall are in abutting contact.

7. A hinged container that comprises:
   (a) a first elongate extruded section of rigid material that includes a first longitudinally extending web and first and second walls that project outwardly in the same direction from the longitudinal edges thereof, with said first wall terminating in an engageable portion;
   (b) a second elongate extruded section of rigid material of the same length and width as said first section, said second section including a second longitudinally extending web that has first and second side walls projecting outwardly in the same direction from the longitudinal edges thereof, with said first side wall terminating in an engaging member that slidably and rotatably engages said engageable portion, and the free edges of said second wall and second side wall being in abutting contact when said second section is pivoted to a closed position on said first section;
   (c) two end pieces bonded to the end interior surfaces of said first section and projecting outwardly therefrom, with said end pieces being of such shape and size that the projecting portions thereof abut against the end interior surfaces of said second section when said second section is in said closed position; and
   (d) manually operated fastening means for removably holding said second section in a closed position on said first section.

8. A container as defined in claim 7, wherein said engageable portion is of arcuate transverse cross section and includes in excess of 180 degrees of a circle, said engaging portion is of circular transverse cross section, and the exterior surface of said engageable portion slidably and rotatably engaging the interior surface of said engaging portion.

9. A container as defined in claim 7, wherein said engageable portion is defined by two spaced stops that are connected by an arcuate section of substantially 180 degrees, said engaging portion is of a transverse wedge shape that includes an arcuate surface that slidably engages the interior surface of said arcuate section, and said arcuate surface being of greater length than the spacing between said stops to prevent said second section being inadvertently disengaged from said first section.

10. A container as defined in claim 7 wherein said first and second sections are formed from a lightweight metallic material and said end pieces from a polymerized resin.

11. A container as defined in claim 7 wherein said second wall is formed with a longitudinally extending groove, said second side wall with a longitudinally extending shoulder, and said fastening means is at least one springloaded latch pivotally supported in said groove that at all times tends to remain in engagement with said shoulder when said second section is in a closed position on said first section.

References Cited

UNITED STATES PATENTS

| | | | |
|---|---|---|---|
| 526,110 | 9/1894 | Martin. | |
| 2,339,994 | 1/1944 | Houlihan | 220—31 |
| 3,361,289 | 1/1968 | Mattson | 220—31 |

THERON E. CONDON, *Primary Examiner.*

G. E. LOWRANCE, *Assistant Examiner.*

U.S. Cl. X.R.

220—4; 29—428, 463